Jan. 20, 1925.
A. E. BRONSON
1,523,394
QUICK DETACHABLE CAP
Filed Feb. 12, 1920
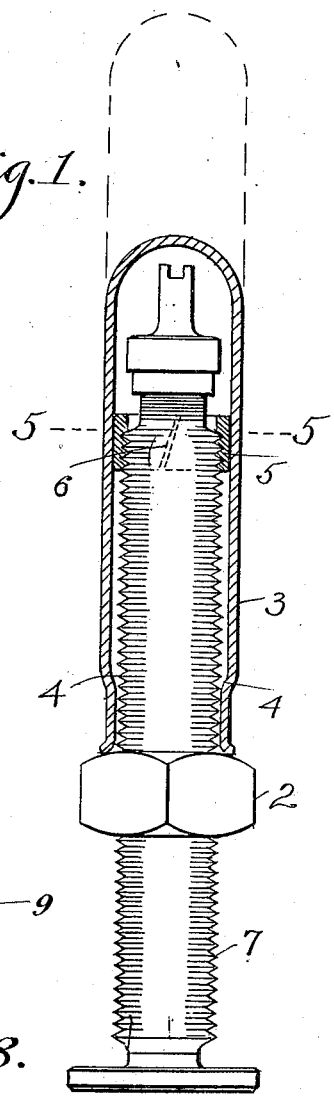
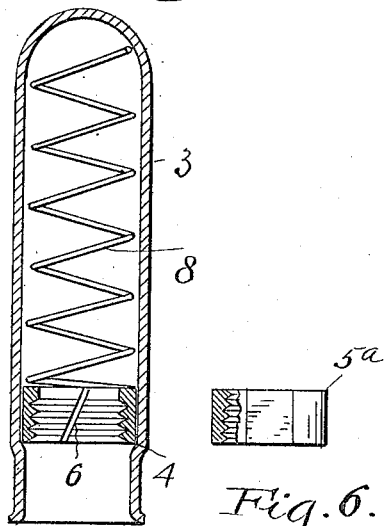
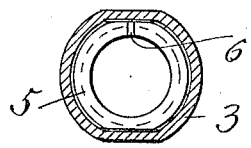
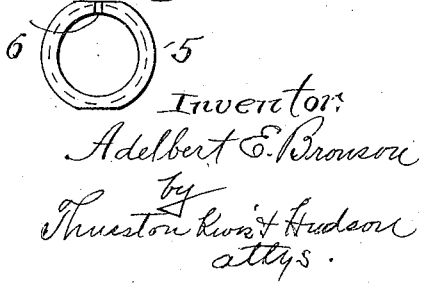
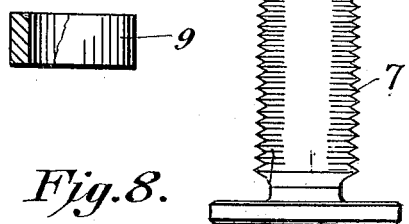
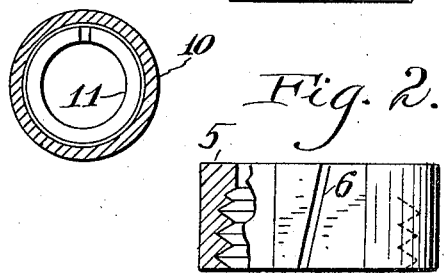

Patented Jan. 20, 1925.

1,523,394

UNITED STATES PATENT OFFICE.

ADELBERT E. BRONSON, OF CLEVELAND, OHIO.

QUICK-DETACHABLE CAP.

Application filed February 12, 1920. Serial No. 358,299.

*To all whom it may concern:*

Be it known that I, ADELBERT E. BRONSON, a citizen of the United States, residing at Cleveland, in the county of Cuyahoga and State of Ohio, have invented a certain new and useful Improvement in Quick-Detachable Caps (B), of which the following is a full, clear, and exact description.

The present invention relates to a construction which is particularly adapted to serve as a quick detachable dust cap for valve stems of pneumatic tires and similar structures.

One of the principal deficiencies of constructions for similar purposes with which I am familiar, is that the cap is not held tight and against vibration and rattling.

By the present invention the cap is held absolutely tight.

Among the objects of the invention may be mentioned the provision of a bushing or nut which is nonrotatably or substantially nonrotatably mounted within the dust cap and positioned so that it may have a sliding movement within the cap and additionally by splitting the nut and threading the inner portion of the nut, less than the depth of the nut or completely threading a tapered opening, there is provided an expanding locking element which absolutely fastens the cap to the valve stem when the parts are properly brought together.

Referring to the drawings, Fig. 1 is a longitudinal sectional elevation of a cap applied to a valve stem; Fig. 2 is a section of a nut; Fig. 3 is a top plan view of the nut; Fig. 4 is a sectional elevation of a modified cap construction; Fig. 5 is a sectional view through the cap showing the split nut in place; Fig. 6 is an elevation with portions in sections showing a modified form of nut.

Referring to the drawings, 1 indicates a valve stem of usual construction and upon the valve stem is a rim nut 2 such as ordinarily used.

The body of shell of the dust cap is indicated at 3. This shell may be formed in any desirable manner but preferably is formed by drawing the same from sheet metal. At the open end the shell is somewhat reduced in diameter to thereby provide a shoulder as indicated at 4.

In cross-section the shell may be of any desired shape but preferably has one or more flat sides so as to prevent rotation of the nut or bushing which is mounted in the shell. In the present instance the shell is shown as provided with two oppositely disposed flat sides. This however should be considered merely as illustrative of any means for preventing relative rotation of the nut and shell.

Within the shell there is a nut or bushing which in Fig. 1 is shown as positioned in the shell in such fashion that the sides of the nut engage with the wall of the shell, the nut being free to slide within the shell. The movement of the nut is limited by the shoulder 4 and the closed end of the shell.

The simplest form which the inventor may assume, is where the nut has a frictional fit within the shell and preferably the nut provided with internal threads which do not extend entirely through the central opening of the nut.

The nut is split as indicated at 6 in the drawings. Under such conditions it will readily be seen that the nut expands when the threads of the valve stem come to the unthreaded portion of the nut and hence a very positive expansion of the nut is obtained and consequent tight frictional engagement with the wall of the shell.

The same effect is secured by having the central opening of the nut provided with a tapered central opening which is threaded. This form of nut or bushing is shown at 5ª in Fig. 6. As the nut threads on the valve stem, it will cause the expansion thereof.

In removing the cap, a turn or two is given the shell, to release the nut from its expanded condition, then the cap is pulled out which places the nut against the shoulder 4 of the shell, thereupon the cap is given a few more turns which results in turning the nut off of the end of the valve stem.

It is not necessary in removing the cap, to pull it outwardly after relieving the expansion of the nut. If desired the rotation of the cap may be continued until the nut is turned off of the valve stem and then the cap withdrawn. This leaves the nut in adjusted position to cooperate with the valve stem when the cap is subsequently introduced over the stem and the fastened condition is secured by giving the shell a few turns which will expand the nut.

In other words when once the nut is adjusted in the shell to cooperate with a given valve stem it may be put on and taken off the stem like the ordinary dust cap, but obviously the time required will be short because the number of threads on the nut and stem which engage are but few.

In Fig 4, the same general construction which has been heretofore described is employed but a spring 8 is placed between the nut and the end of the cap. This spring is of sufficient strength to force the nut to the shoulder 4 at the open end of the cap, hence the nut is always in proper position to function and moreover the spring prevents the nut from becoming positioned in the shell beyond a position where the end of the valve stem can cooperate.

A particular advantage of the described construction lies in the fact that the cap is self-contained and requires no special form of cap or other special parts.

The nut employed is preferably provided with a threaded opening, but the threads may be omitted where the material of the nut is soft so that the threads of the stem may bite in and cause expansion of the nut.

Having described my invention, I claim

1. A dust cap comprising a shell portion, a split member mounted within the shell and slidable therein said member having a central opening which has one portion thereof of less diameter than another portion, said split member being adapted to co-operate with a stem when a cap is inserted over the stem to expand into close contact with the wall of said shell.

2. A dust cap comprising a shell portion, a split member mounted within the shell and slidable therein said member having a central threaded opening, one portion of said opening being of less diameter than another portion, said split member being adapted to co-operate with the stem when the cap is inserted over the stem and to be expanded into close contact with the inner wall of said shell.

3. A dust cap comprising a shell portion, a split member nonrotatably mounted within the shell and capable of sliding therein, said split member being adapted to co-operate with a stem when a cap is inserted over a stem and to be expanded by the stem into close contact with the inner wall of the shell thereby serving to connect the shell to the stem.

4. A dust cap comprising a shell portion, a split nut non-rotatively mounted within the shell and capable of sliding movement therein, said nut having a central opening which is incompletely threaded, said split nut being adapted to co-operate with a stem when the cap is inserted over a stem and to be expanded by the stem into close contact with the inner wall of said shell.

5. A dust cap comprising a shell portion, a split nut non-rotatively mounted within the shell and capable of sliding movement therein, means normally urging the nut toward the open end of the shell, said split nut being adapted to co-operate with a stem when the cap is inserted over a stem and to be expanded by the stem into close contact with the inner wall of said shell.

6. A dust cap comprising a shell portion, a split nut non-rotatively mounted within the shell and capable of sliding movement therein, said nut having an opening which has one portion of less diameter than another portion, a spring located between the nut and the closed end of the cap, the opening in said split nut being adapted to co-operate with a stem when the cap is inserted over a stem and to be expanded by said stem into close contact with the inner wall of the shell.

7. A dust cap comprising a shell portion, a split nut non-rotatively mounted within the shell and slidable therein, said nut having a central opening which is incompletely threaded, means normally urging the nut toward the open end of the shell, the central opening in said split nut being adapted to co-operate with the stem when the cap is inserted over a stem and to be expanded by the stem into close contact with the inner wall of the shell.

8. A new article of manufacture, a cap for valve stems and the like comprising a shell portion having an open end and a movable member within the shell and expandible into engagement with the shell.

9. A new article of manufacture, a cap for valve stems and the like comprising a shell portion, a split member within said shell which is expandible into engagement with the inner walls of said shell.

10. A cap for use with a valve stem or the like comprising a shell having an open end a gripping member mounted in the shell and capable of sliding movement in the shell said gripping member engaging with the stem and thereby expanded to lock the shell and stem together.

11. A cap for valve stems and the like comprising a shell portion having an open end, a gripping member adapted for engagement with a valve stem and operable by its engagement with a valve stem to expand and lock the stem and shell upon rotary movement of the shell.

12. A cap for valve stems and the like comprising a shell portion having an open end, a gripping member capable of sliding movement within the shell and expandible to gripping position upon the shell by operation of the shell when the said gripping member co-operates with a stem when the cap is inserted over a stem.

In testimony whereof, I hereunto affix my signature.

ADELBERT E. BRONSON.